United States Patent
Huang et al.

(10) Patent No.: US 10,146,285 B2
(45) Date of Patent: Dec. 4, 2018

(54) METHOD FOR EXTENDING HOLD TIME OF POWER SUPPLY UNITS

(71) Applicant: Quanta Computer Inc., Taoyuan (TW)

(72) Inventors: Jen-Hsuen Huang, Taoyuan (TW); Fa-Da Lin, Taoyuan (TW); Wei-Tsung Tang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 509 days.

(21) Appl. No.: 14/687,614

(22) Filed: Apr. 15, 2015

(65) Prior Publication Data

US 2016/0306402 A1    Oct. 20, 2016

(51) Int. Cl.
| | |
|---|---|
| *G06F 1/32* | (2006.01) |
| *G06F 1/26* | (2006.01) |
| *G06F 1/20* | (2006.01) |
| *G06F 1/30* | (2006.01) |

(52) U.S. Cl.
CPC .............. *G06F 1/263* (2013.01); *G06F 1/206* (2013.01); *G06F 1/266* (2013.01); *G06F 1/30* (2013.01); *G06F 1/305* (2013.01); *G06F 1/324* (2013.01); *G06F 1/325* (2013.01); *G06F 1/3206* (2013.01); *G06F 1/3253* (2013.01); *G06F 1/3287* (2013.01); *Y02D 10/126* (2018.01); *Y02D 10/151* (2018.01); *Y02D 10/16* (2018.01); *Y02D 10/171* (2018.01)

(58) Field of Classification Search
CPC ....................................................... G06F 1/263
See application file for complete search history.

(56) References Cited

U.S. PATENT DOCUMENTS

| | | | |
|---|---|---|---|
| 7,051,218 B1* | 5/2006 | Gulick | .................. G06F 1/3203 710/21 |
| 2004/0178681 A1* | 9/2004 | Klenner | .................... G06F 1/28 307/66 |
| 2005/0184773 A1* | 8/2005 | Boyko | ...................... G06F 1/06 327/156 |

(Continued)

FOREIGN PATENT DOCUMENTS

| | | |
|---|---|---|
| JP | 2011008728 A | 1/2011 |
| TW | 201301125 A | 1/2013 |
| TW | 201319796 A | 5/2013 |

OTHER PUBLICATIONS

Taiwanese Office Action for Application No. 104130395, dated Feb. 10, 2017, w/ First Office Action Summary.

(Continued)

*Primary Examiner* — Kim Huynh
*Assistant Examiner* — Eric Chang
(74) *Attorney, Agent, or Firm* — Nixon Peabody LLP; Eduardo J. Quiñones (57) ABSTRACT

Various examples of the present technology provide systems and methods for monitoring an AC power to a computing system, generating a power failure signal when the AC power is determined abnormal, and cause one or more components of the computing system to be switched to a low power mode or shut down to reduce power consumption of the computing system. In particular, the various embodiments of the present technology provide a method to extend hold time of a power supply unit (PSU), thus extend power-on time of a server system during an input power interruption.

20 Claims, 5 Drawing Sheets

(56) References Cited

U.S. PATENT DOCUMENTS

| | | | |
|---|---|---|---|
| 2007/0250218 A1* | 10/2007 | Culley | G06F 1/26 |
| | | | 700/295 |
| 2008/0209237 A1 | 8/2008 | Kim | |
| 2009/0164820 A1 | 6/2009 | Abraham | |
| 2011/0106332 A1* | 5/2011 | Lee | G06F 1/206 |
| | | | 700/300 |
| 2012/0054520 A1 | 3/2012 | Ben-Tsion | |
| 2012/0192007 A1 | 7/2012 | Weilnau, Jr. et al. | |
| 2014/0281646 A1 | 9/2014 | Jau et al. | |
| 2014/0365795 A1* | 12/2014 | Nielsen | G06F 9/45558 |
| | | | 713/320 |

OTHER PUBLICATIONS

Extended European Search Report for European Application No. 15185658.0 dated Dec. 8, 2015.
Japanese Office Action for Application No. 2016-048400, dated Jan. 17, 2017, w/ First Office Action Summary.

* cited by examiner

METHOD FOR EXTENDING HOLD TIME OF POWER SUPPLY UNITS

TECHNICAL FIELD

The present technology relates generally to server systems in a telecommunications network.

BACKGROUND

Modern server farms or datacenters typically employ a large number of servers to handle processing needs for a variety of application services. Each server handles various operations and requires a certain level of power consumption to maintain these operations. Some of these operations are "mission critical" operations and interruptions to these operations may lead to significant security breach or revenue losses for users associated with these operations.

However, transient fluctuations of an AC power to datacenters can be unpredictable. For example, power interruptions may originate in commercial power grids, which typically utilize long transmission lines vulnerable to weather conditions (e.g., storms and flooding) equipment subject to failure, and major switching operations. In some cases, power interruptions can force a shutdown of a datacenter and can require many hours to resume normal operations.

SUMMARY

Systems and methods in accordance with various embodiments of the present technology provide a solution to the above-mentioned problems by reducing power consumption of a server system in response to detecting a power interruption. More specifically, various embodiments of the present technology provide methods for monitoring an AC power to a computing system, generating a power failure signal when the AC power is determined abnormal, and cause one or more components of the computing system to be switched to a low power mode or shut down to reduce power consumption of the computing system. In particular, the various embodiments of the present technology provide a method to extend hold time of a power supply unit (PSU), thus extend power-on time of a server system during an input power interruption. A hold time of the computing system can be defined as an amount of time that the PSU can maintain a DC output within a predefined voltage range when an AC input power to the computing system is lost. When the input power is back to normal, the server system can quickly resume normal operations without going through time-consuming power-down and/or rebooting processes.

In some implementations, in response to an input power interruption, a system controller can cause power supplied to one or more specific components of the server system to be reduced or disabled. The one or more specific components of the server system can include, but are not limited to, one or cooling devices, a CPU, memory, or one or more storage devices (e.g., just bunch of disks (JBOD)). When the input power is back to normal or switched to a UPS, the system controller can cause power supplied to the one or more specific components to be resumed to a power amount under normal operations.

In some implementations, an I/O controller can facilitate a clock/frequency scaling of at least one of a CPU, double data rate (DDR), or system bus, when a predetermined condition occurs. The predetermined condition can include receiving a power failure signal from a PSU, and/or detecting an over-temperature condition on one or more components of the server system.

In some implementations, a clock/frequency scaling of a CPU, DDR or system bus can be accomplished by propagating programmable information stored in an I/O controller into a clock generator of the server system. The programmable information can indicate an amount of adjustment to an operating frequency of a clocking signal. In some implementations, clocking signals of a CPU, DDR and system BUS of the server system can be adjusted independently and/or proportionally according to the programmable information from the I/O controller.

In some implementations, an I/O controller can further generate a voltage modification signal to a PSU of the server system. The voltage modification signal can cause a CPU core voltage to be adjusted proportionally to an adjusted operating frequency of a CPU.

In some implementations, during throttling and de-throttling processes, an operating frequency and a core voltage of a CPU of the server system are adjusted with a specific order to reduce the possibility of a CPU failure. For example, the operating frequency of the CPU can be reduced before the CPU core voltage is reduced during a throttling process. While the CPU core voltage is increased before the operating frequency of the CPU is increased during a de-throttling process.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Various embodiments of the present technology provide methods for extending hold time of a power supply unit (PSU) to a server system. When an AC input power to the server system is interrupted, the PSU can generate a power failure signal that causes one or more components of the server system to be switched to a low power mode or shut down to reduce power consumption of the server system.

With reduced power consumption, the server system can be operational for a longer period of time without requiring a system shutdown, or a subsequent rebooting when the AC input power comes back to normal or an alternative power source (e.g., an uninterruptible power supply (UPS) such as a backup battery unit (BBU)) is caused to supply power to the system.

Figure 1:
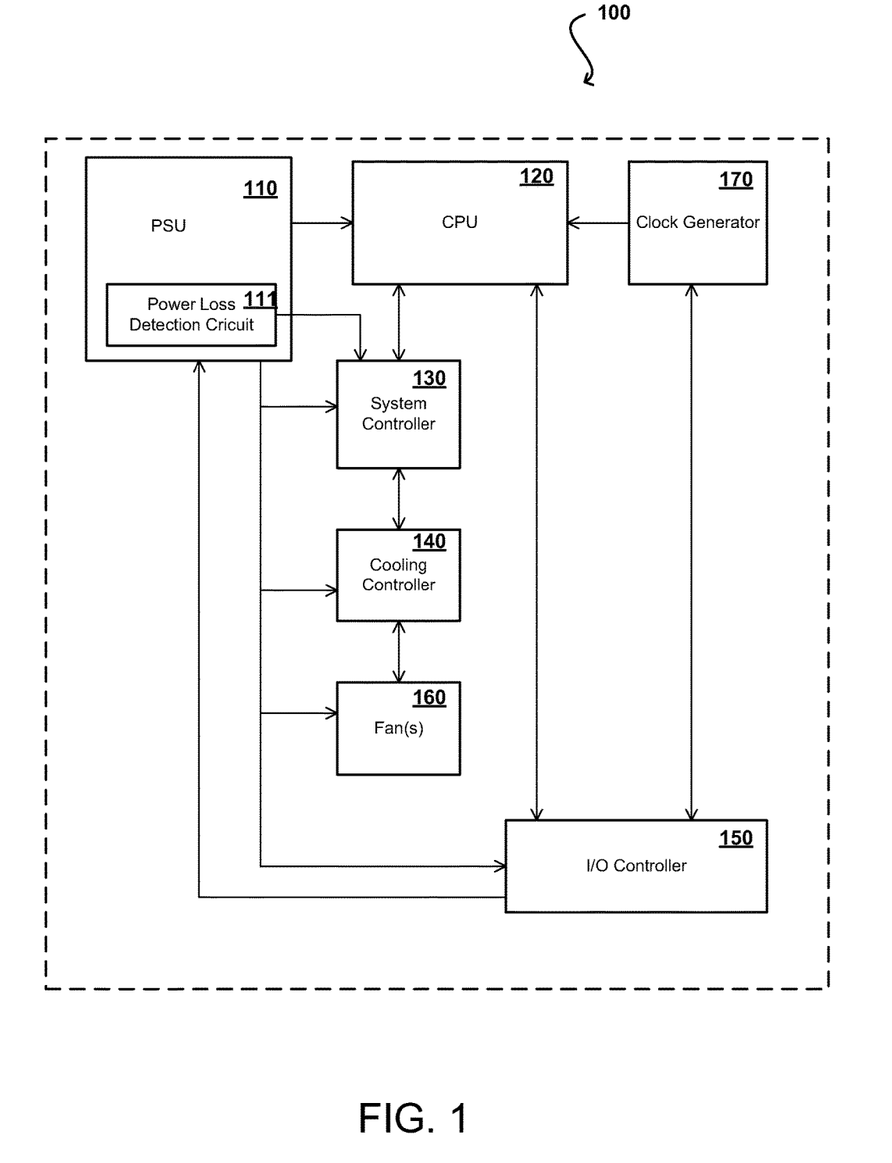
FIG. 1 illustrates a schematic block diagram of an exemplary server system in accordance with an implementation of the present technology.

FIG. 1 illustrates a schematic block diagram of an exemplary server system 100 in accordance with an implementation of the present technology. In this example, the server system 100 comprises at least one power supply unit (PSU) 110, at least one central processing unit (CPU) 120, a clock generator 170, an I/O controller 150, a system controller 130, a cooling controller 140, and at least fan 160. The PSU 110 contains a power-loss-detection circuit 111 and is configured to supply powers to various component of the server system 100, such as the CPU 120, system controller 130, cooling controller 140, one or more cooling devices (e.g., one or more liquid cooling devices, fans 160, or a combination of liquid cool devices and fans) and I/O controller 150. After being powered on, the server system 100 is configured to load software application from memory, computer storage device, or an external storage device to perform various operations.

In this example, the power-loss-detection circuit 111 can be configured to monitor an AC power to the server system 100 and send out a power failure signal when an AC power fault is detected. The AC power failure can include, but is not limited to, transient, interruption, under-voltage, overvoltage, waveform distortion, voltage fluctuation, and frequency variation of an AC power to the server system 100. The power failure signal can be sent to the system controller 130 and/or the I/O controller 150. In some implementations, the system controller 130 and I/O controller 150 can be integrated into one chipset.

In some implementations, the system controller 130 is configured to send control signals to the PSU 110 and cause power to be supplied to the CPU 120, the one or more cooling devices, memory, one or more storage devices (e.g., JBOD), and other components of the server system 100. In response to receiving a power failure signal, the system controller 130 can cause power supplied to one or more specific components of the server system 100 (e.g., the one or cooling devices, the CPU 120, memory, or the one or more storage devices) to be reduced or disabled.

In some implementations, the server system 100 can include one or more energy storage devices (ESDs). The ESDs can be at least one of capacitors, various batteries, flywheels, compressed air-based devices, or inductor-based devices. During normal operations, current can flow from one or more power components of the server system 100 to the one or more ESDs. When an AC power to the server system 100 is interrupted, current can flow out of the one or more ESDs to a DC/DC converter or a power distribution circuit to distribute to other components of the server system 100. In some implementations, by reducing power consumption under power failure conditions, the one or more ESDs can have a lower energy storage capacity to reduce an overall cost of the PSU 110.

When the AC power is back to normal or an alternative power source (e.g., uninterruptible power supply (UPS)) is switched on, the system controller 130 can cause power that is supplied to the one or more specific components of the server system 100 to be resumed to a power amount under normal operations. Therefore, the server system 100 can quickly resume normal operations without requiring a time-consuming system shutdown and subsequent rebooting. A better tolerance can be achieved for the server system 100 under power failure conditions.

In some implementations, different types of sensors built into the server system 100 can report parameters (e.g., temperature, cooling fan speeds, power status, and/or operating system (OS) status) to the system controller 130 and/or I/O controller 150. The system controller 130 can then monitor these sensors on the server system 100 and can be configured to take appropriate action when necessary. For example, in response to any parameter on the sensors going beyond preset limits, which can indicate a potential failure of the server system 100, the system controller 130 can be configured to perform a suitable operation in response to the potential failure. The suitable operation can include, but is not limited to, sending an alert to the CPU 120 or a system administrator over a network, or taking some corrective action such as resetting or power cycling the node to get a hung OS running again).

In some implementations, the I/O controller 150 can be configured to facilitate voltage and clock/frequency scaling of the CPU 120 when at least one of a plurality of predetermined conditions occurs on the server system 100. The predetermined conditions can include receiving a power failure signal from the PSU 110, and/or detecting an over-temperature condition on one or more components of the server system 100 (e.g., on the CPU 120, memory, or one or more storage devices). In some implementations, the I/O controller 150 can program a register within the clock generator 170 to propagate programmable information stored within the I/O controller 150 into the clock generator 170. The programmable information can indicate an amount of adjustment (e.g., a predetermined percentage) to an operating frequency of a clocking signal, which is supplied from the clock generator 170 to the CPU 120, to be adjusted. In some implementations, a clock/frequency signal used by a system bus (not shown) of the server system 100 can have a predetermined relationship with the clocking signal input into the CPU 120. The I/O controller 150 can cause the clocking signals of the CPU 120, system bus and DDR to be adjusted proportionally via the programmable information.

In some implementations, the I/O controller 150 can further generate a voltage modification signal for a CPU core voltage and then transmit the voltage modification signal to the PSU 110. The voltage modification signal can have a predetermined relationship with the adjusted operating frequency of the CPU 120 and can cause the CPU core voltage to be adjusted proportionally with respect to the adjusted operating frequency of the CPU 120. In some implementations, a specific sequence of scaling can be enforced when adjusting an operating frequency and a core voltage of the CPU 120 to reduce the possibility of CPU failure during a scaling process. For example, during a throttling process, the operating frequency of the CPU 120 can be reduced before the core voltage is reduced. On the other hand, during a de-throttling process, the core voltage is increased before the operating frequency of the CPU 120 is increased.

In some implementations, the system controller 130 is a baseboard management controller or a rack system controller that can provide system controls independently from an operating system running on the server system 100. For example, the system controller 130 can be powered on and operational when the CPU 120 is powered down or is running in a power saving mode.

Although only certain components are shown within the server system 100 in FIG. 1, various types of electronic or computing components that are capable of processing or storing data, or receiving or transmitting signals can also be included in server system 100. Further, the electronic or computing components in the server system 100 can be configured to execute various types of application and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the server system 100, a variety of networking and messaging protocols can be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the server system 100 illustrated in FIG. 1 is used for purposes of explanation. Therefore, a network system can be implemented with many variations, as appropriate, yet still provide a configuration of network platform in accordance with various embodiments of the present technology.

In exemplary configuration of FIG. 1, the server system 100 can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various embodiments.

Figure 2:
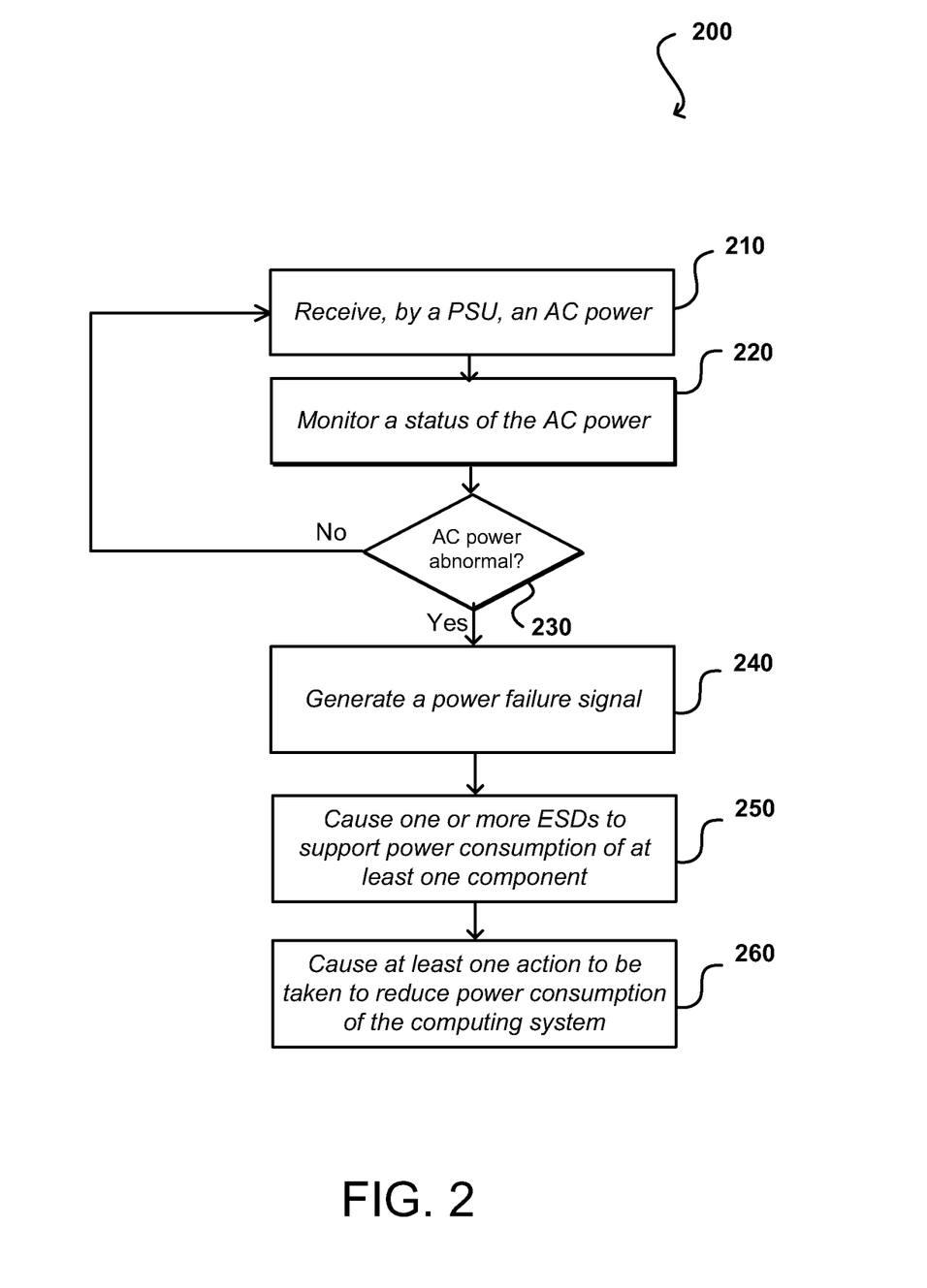
FIG. 2 illustrates an exemplary method of extending hold time of a power supply unit (PSU) in a computing system in accordance with an implementation of the present technology.

FIG. 2 illustrates an exemplary method 200 of extending hold time of a power supply unit (PSU) in a computing system in accordance with an implementation of the present technology. It should be understood that the exemplary method 200 is presented solely for illustrative purposes and that in other methods in accordance with the present technology can include additional, fewer, or alternative steps performed in similar or alternative orders, or in parallel.

The exemplary method 200 starts with receiving an AC power by a power supply unit (PSU), at step 210. The AC power can be converted to a DC power by the PSU and then distributed to various components of the computing system.

At step 220, the AC power can be monitored by a power-loss-detection circuit. A status of the AC power can be determined in substantially real time, at step 230. In response to a determination that the AC power is abnormal, a power failure signal can be generated and sent to a controller of the computing system, at step 240.

In response to receiving the power failure signal, one or more energy storage devices (ESDs) can be used to support power consumption of at least one of a plurality of components of the computing system, at step 250. The one or more ESDs can be at least one of capacitors, various batteries, flywheels, compressed air-based devices, or inductor-based devices. At step 260, at least one action can be taken to reduce power consumption of the computing system. The at least one action can include, but is not limited to, reducing or disabling power supplied to one or more specific components of the computing system. In some embodiments, the at least one action takes a priority over other actions of the computing system and can be executed in a next clock cycle.

Figure 3:
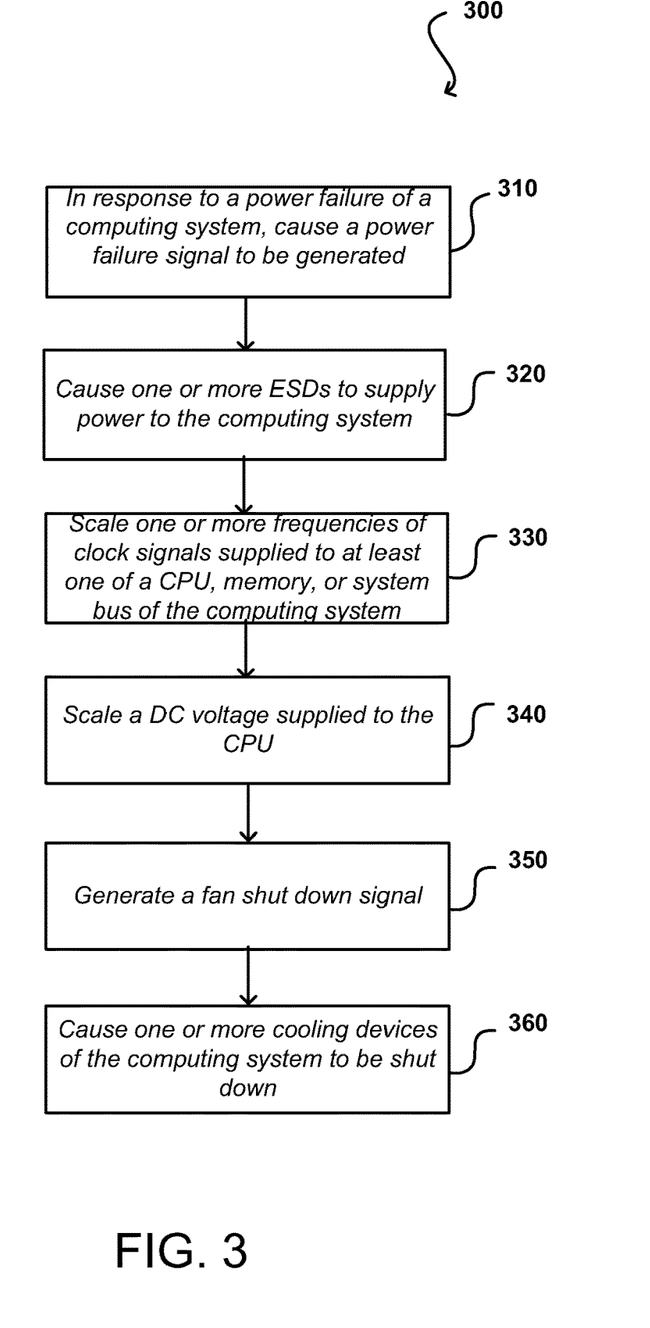
FIG. 3 illustrates another exemplary method of extending hold time of a power supply unit (PSU) in a computing system in accordance with an implementation of the present technology.

FIG. 3 illustrates another exemplary method of extending hold time of a power supply unit (PSU) in a computing system in accordance with an implementation of the present technology. The exemplary method 300 starts with generating a power failure signal in response to detecting a power failure of an input AC power to a computing system, at step 310. One or more energy storage devices (ESDs) can be used to supply power to the computing system when the power failure is detected, at step 320. One or more operating frequencies of clock signals supplied to at least one of a CPU, memory, or system bus of the computing system can be scaled, at step 330.

After the operating frequency of a clock signal supplied to the CPU is scaled, a DC voltage supplied to the CPU can be scaled proportionally according to an adjustment of the operating frequency of the clock signal supplied to the CPU, at step 340.

At step 350, a fan shut down signal can be generated. The fan shut down signal can cause one or more cooling devices of the computing system to be shut down to further reduce power consumption of the computing system.

Terminologies

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources can include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources can be used to support virtual networks, virtual machines (VM), databases, applications (Apps), etc.

Cloud computing resources can include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 4:
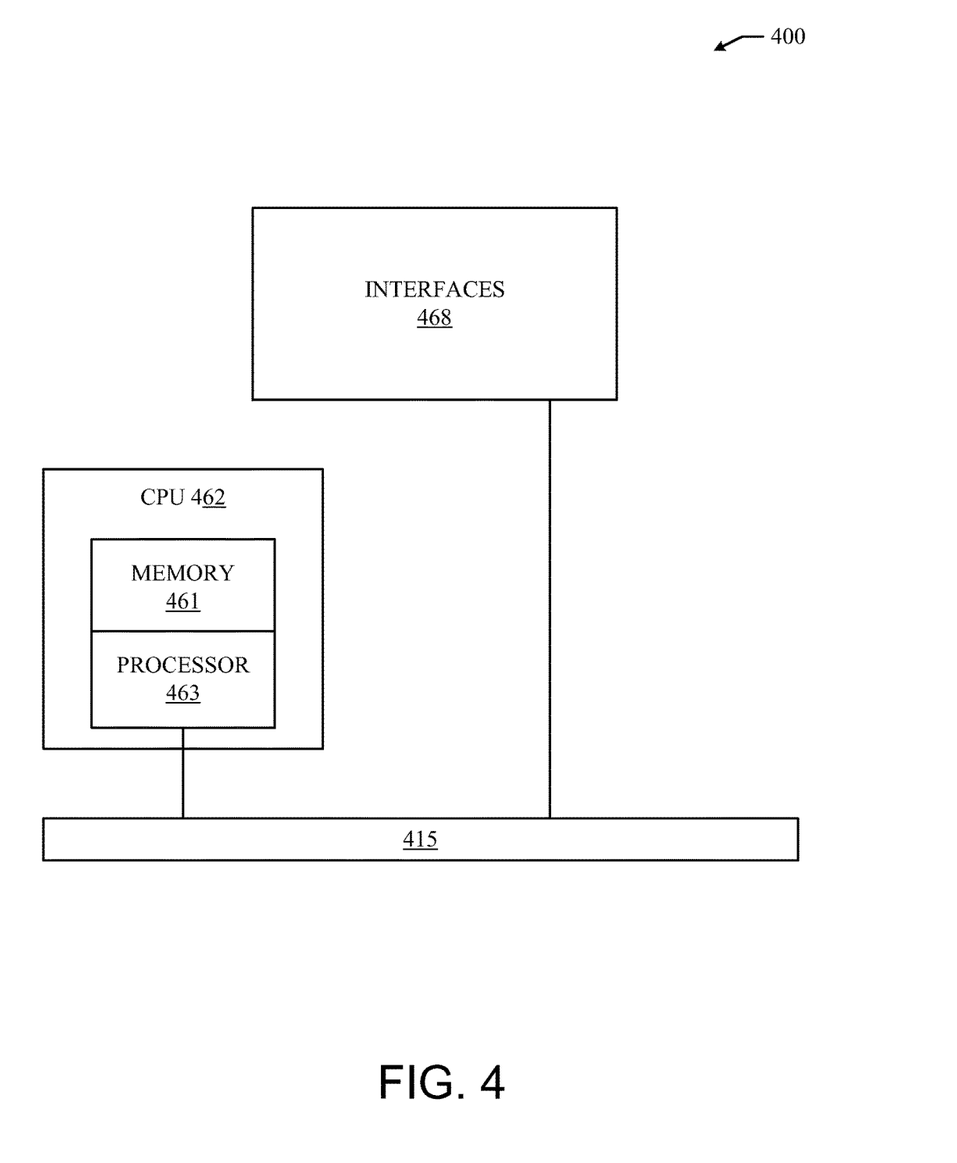
FIG. 4 illustrates an exemplary computing device in accordance with various implementations of the technology.

In a network switch system, a lookup database can be maintained to keep track of routes between a number of end points attached to the switch system. However, end points can have various configurations and are associated with numerous tenants. These end-points can have various types of identifiers, e.g., IPv4, IPv6, or Layer-2. The lookup database has to be configured in different modes to handle different types of end-point identifiers. Some capacity of the lookup database is carved out to deal with different address types of incoming packets. Further, the lookup database on the network switch system is typically limited by 1K virtual routing and forwarding (VRFs). Therefore, an improved lookup algorithm is desired to handle various types of end-point identifiers. The disclosed technology addresses the need in the art for address lookups in a telecommunications network. Disclosed are systems, methods, and computer-readable storage media for unifying various types of end-point identifiers by mapping end-point identifiers to a uniform space and allowing different forms of lookups to be uniformly handled. A brief introductory description of example systems and networks, as illustrated in FIGS. 4 and 5, is disclosed herein. These variations shall be described herein as the various examples are set forth. The technology now turns to FIG. 4.

FIG. 4 illustrates an example computing device 400 suitable for implementing the present technology. Computing device 400 includes a master central processing unit (CPU) 462, interfaces 468, and a bus 415 (e.g., a PCI bus). When acting under the control of appropriate software or firmware, the CPU 462 is responsible for executing packet management, error detection, and/or routing functions, such as miscabling detection functions, for example. The CPU 462 preferably accomplishes all these functions under the control of software including an operating system and any appropriate applications software. CPU 462 can include one or more processors 463 such as a processor from the Motorola family of microprocessors or the MIPS family of microprocessors. In an alternative embodiment, processor 463 is specially designed hardware for controlling the operations of the computing device 400. In a specific embodiment, a memory 461 (such as non-volatile RAM and/or ROM) also forms part of CPU 462. However, there are many different ways in which memory could be coupled to the system.

The interfaces 468 are typically provided as interface cards (sometimes referred to as "line cards"). Generally, they control the sending and receiving of data packets over the network and sometimes support other peripherals used with the computing device 400. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control and management. By providing separate processors for the communications intensive tasks, these interfaces allow the CPU 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 461) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

Figure 5A:
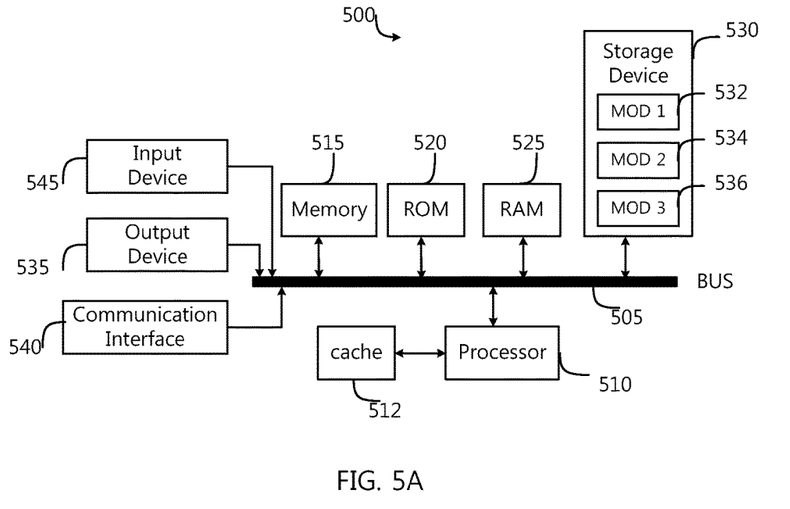
FIGS. 5A and 5B illustrate exemplary systems in accordance with various embodiments of the present technology.
Figure 5B:
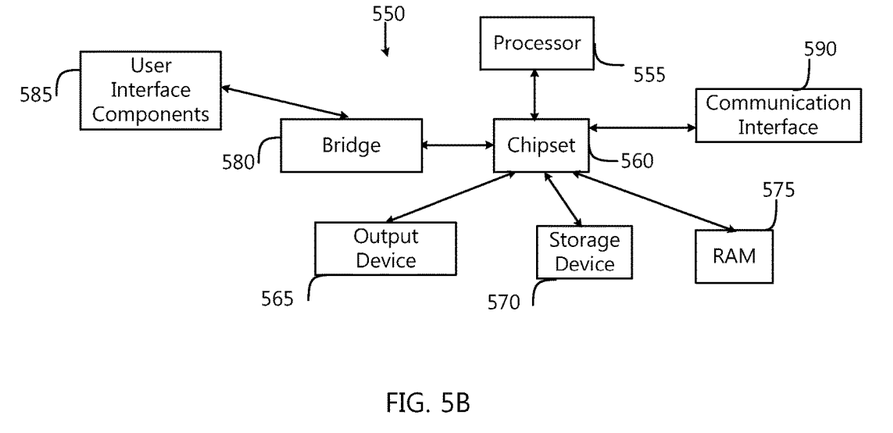

FIG. 5A, and FIG. 5B illustrate example possible systems in accordance with various aspects of the present technology. The more appropriate embodiment will be apparent to those of ordinary skill in the art when practicing the present technology. Persons of ordinary skill in the art will also readily appreciate that other system examples are possible.

FIG. 5A illustrates a conventional system bus computing system architecture 500 wherein the components of the system are in electrical communication with each other using a bus 505. Example system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 can be available for use as well. The memory 515 can include multiple different types of memory with different performance characteristics. The processor 510 can include any general purpose processor and a hardware module or software module, such as module 532, module 534, and module 536 stored in storage device 530, configured to control the processor 510 as well as a special-purpose processor where software instructions are incorporated into the actual processor design. The processor 510 can essentially be a completely self-contained computing system, containing multiple cores or processors, a bus, memory controller, cache, etc. A multi-core processor can be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here can easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, output device 535 (e.g., a display), and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or RAM 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various aspects of the present technology provide methods for reducing power consumption of a server system in response to detecting an input power interruption. While specific examples have been cited above showing how the optional operation can be employed in different instructions, other examples can incorporate the optional operation into different instructions. For clarity of explanation, in some instances the present technology can be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present invention can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these technology can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the invention as set forth in the claims.

What is claimed is:

1. A server system, comprising:
   at least one processor;
   a power supply unit (PSU), the PSU including a power-loss-detection circuit configured to monitor a status of an AC input power to the server system and, in response to a determination that the AC input power is abnormal, generate a power failure signal; and
   a controller, the controller configured to,
   receive the power failure signal;
   cause one or more energy storage devices (ESDs) to support power consumption of at least one of a plurality of components of the server system;
   facilitate a clock or frequency scaling of a CPU, a system bus and memory of the server system; and
   propagate programmable information stored within an I/O controller of the server system to a clock generator, wherein the programmable information indicates an amount of an operating frequency of a first clock signal to the CPU to be adjusted, and wherein clock signals of the CPU, the system bus, and the memory of the server system are adjusted independently according to the programmable information.

2. The system of claim 1, wherein the power failure signal causes at least one action to be taken, the at least one action comprising causing power supplied to one or more specific components of the server system to be reduced or disabled.

3. The system of claim 2, wherein the one or more specific components of the server system include a CPU, memory, just bunch of disks (JBOD), and one or more cooling devices.

4. The system of claim 2, wherein the controller is further configured to:
   in response to a determination that the AC input power is back to normal, cause the one or more ESDs to be recharged; and
   cause power supplied to the one or more specific components of the server system to be resumed to a power amount under normal operations.

5. The system of claim 1, wherein the power failure signal causes at least one action to be taken, the at least one action comprising facilitating a clock or frequency scaling of a double data rate (DDR) of the server system, when at least one of a plurality of predetermined conditions occurs.

6. The system of claim 5, wherein the plurality of predetermined conditions include the determination that the AC input power is abnormal, and detecting an over-temperature condition on one or more of the plurality of components of the server system.

7. The system of claim 5, wherein the controller is further configured to cause the system to:
   cause the first clock signal to the CPU to be adjusted according to the programmable information.

8. The system of claim 7, wherein the controller is further configured to cause the system to:
   cause a second clock signal to the system bus to be adjusted proportionally to the first clock signal.

9. The system of claim 7, wherein the controller is further configured to cause the system to:
   generate a voltage modification signal to a power supply unit (PSU) of the server system; and
   cause a CPU core voltage to be adjusted proportionally to an adjusted operating frequency of the CPU.

10. The system of claim 9, wherein the controller is further configured to cause the system to:
    in response to a determination that the input power the AC input power is back to normal, cause the CPU core voltage to be resumed to a voltage amount under normal operations; and
    cause the operating frequency of the first clock signal to the CPU to be resumed to a frequency amount under normal operations.

11. The system of claim 5, wherein the controller is further configured to cause the system to:
    generate a fan-shut-down signal; and
    cause one or more cooling devices of the server system to be shut down.

12. The system of claim 11, wherein the one or more cooling devices include at least one liquid cooling device or fan.

13. A computer-implemented method for enhancing memory fault tolerance in a server system, comprising:
    receiving a power failure signal, the power failure signal indicating an input power to the server system being abnormal;

causing one or more energy storage devices (ESDs) to support power consumption of at least one of a plurality of components of the server system;
facilitating a clock or frequency scaling of a CPU, a system bus and memory of the server system; and
propagating programmable information stored within an I/O controller of the server system to a clock generator, wherein the programmable information indicates an amount of an operating frequency of a first clock signal to the CPU to be adjusted, and wherein clock signals of the CPU, the system bus, and the memory of the server system are adjusted independently according to the programmable information.

14. The computer-implemented method of claim 13, wherein causing at least one action to be taken includes:
facilitating a clock or frequency scaling of a DDR of the server system, when at least one of a plurality of predetermined conditions occurs.

15. The computer-implemented method of claim 14, further comprising:
causing the first clock signal to the CPU to be adjusted according to the programmable information.

16. The computer-implemented method of claim 15, further comprising: causing a second clock signal to the system bus to be adjusted proportionally to the first clock signal.

17. The computer-implemented method of claim 15, further comprising:
generating a voltage modification signal to a power supply unit (PSU) of the server system; and
causing a CPU core voltage to be adjusted proportionally to an adjusted operating frequency of the CPU.

18. A non-transitory computer-readable storage medium including instructions that, when executed by at least one processor of a server system, cause the server system to:

monitor a status of an AC input power to the server system;
in response to a determination that the AC input power is abnormal, generate a power failure signal;
cause one or more energy storage devices (ESDs) to support power consumption of at least one of a plurality of components of the server system;
facilitate a clock or frequency scaling of a CPU, a system bus and memory of the server system; and
propagate programmable information stored within an I/O controller of the server system to a clock generator, wherein the programmable information indicates an amount of an operating frequency of a first clock signal to the CPU to be adjusted, and wherein clock signals of the CPU, the system bus, and the memory of the server system are adjusted independently according to the programmable information.

19. The non-transitory computer-readable storage medium of claim 18, wherein the instructions when executed further cause the system to:
cause power supplied to one or more specific components of the server system to be reduced or disabled.

20. The non-transitory computer-readable storage medium of claim 19, wherein the instructions when executed further cause the system to:
in response to a determination that the AC input power is back to normal, cause the one or more ESDs to be recharged; and
cause power supplied to the one or more specific components of the server system to be resumed to a power amount under normal operations.

* * * * *